United States Patent
Markowski

(10) Patent No.: US 7,323,851 B2
(45) Date of Patent: Jan. 29, 2008

(54) DIGITAL POWER FACTOR CORRECTION CONTROLLER AND AC-TO-DC POWER SUPPLY INCLUDING SAME

(75) Inventor: Piotr Markowski, Worcester, MA (US)

(73) Assignee: Artesyn Technologies, Inc., Boca Raton, FL (US)

( * ) Notice: Subject to any disclaimer, the term of this patent is extended or adjusted under 35 U.S.C. 154(b) by 176 days.

(21) Appl. No.: 11/232,517

(22) Filed: Sep. 22, 2005

(65) Prior Publication Data

US 2007/0067069 A1  Mar. 22, 2007

(51) Int. Cl.
 *G05F 1/10* (2006.01)
(52) U.S. Cl. .................. 323/222; 323/290; 363/80; 363/89; 327/530
(58) Field of Classification Search .......... 363/45–49, 363/25, 80, 89, 81, 15–19, 126; 323/222; 315/247, 307
See application file for complete search history.

(56) References Cited

U.S. PATENT DOCUMENTS

| | | | |
|---|---|---|---|
| 5,631,550 A | | 5/1997 | Castro et al. |
| 5,777,866 A | * | 7/1998 | Jacobs et al. ............... 363/126 |
| 5,801,935 A | | 9/1998 | Sugden et al. |
| 6,191,676 B1 | | 2/2001 | Gabor |
| 6,448,745 B1 | | 9/2002 | Killat |
| 6,917,185 B2 | * | 7/2005 | Okamoto ................... 323/241 |
| 2003/0090242 A1 | | 5/2003 | Lin |
| 2003/0184938 A1 | | 10/2003 | Tan |
| 2004/0027096 A1 | | 2/2004 | Chen |
| 2004/0150377 A1 | | 8/2004 | Elek et al. |

(Continued)

FOREIGN PATENT DOCUMENTS

WO   WO 00/07414   2/2000

OTHER PUBLICATIONS

Chen, J., et al., "Predictive digital current programmed control," IEEE Trans. on Power Electronics, vol. 18, Issue 1, Part 2, Jan. 2003, pp. 411-419.

(Continued)

*Primary Examiner*—Rajnikant B. Patel
(74) *Attorney, Agent, or Firm*—Kirkpatrick & Lockhart Preston Gates Ellis LLP

(57) ABSTRACT

A PFC AC-to-DC power supply is disclosed. According to various embodiments, the PFC AC-to-DC power supply comprises a switching converter comprising at least one main power switch and a PFC controller for controlling the at least one main power switch. The PFC controller may comprise a processing unit comprising a processor and a memory having firmware stored thereon which, when executed by the processor, causes the processor to compute an input current set point for the AC-to-DC power supply based on the output voltage of the AC-to-DC power supply. The PFC controller may also comprise hardware circuitry in communication with the processing unit. The hardware circuitry may comprise a first a/d converter, such as a window a/d converter, for outputting a digital input current error value based on the input current of the AC-to-DC power supply and an analog form of the input current set point from the processing unit. The hardware circuitry may also comprise a digital current mode compensator in communication with the first a/d converter for determining the duty cycle for the at least one main power switch based on the digital input current error value from the a/d converter.

21 Claims, 3 Drawing Sheets

U.S. PATENT DOCUMENTS

2004/0164718 A1   8/2004   McDaniel
2005/0007083 A1   1/2005   Yang
2005/0088864 A1   4/2005   Montorsi et al.
2005/0128773 A1   6/2005   Yang et al.
2005/0146908 A1   7/2005   Feldtkeller
2005/0174813 A1   8/2005   Dou
2005/0201124 A1   9/2005   Lanni

OTHER PUBLICATIONS

Xie, M., "Digital Control For Power Factor Correction," PhD. Thesis, Virgina Polytechnic Institute and State University, Jun. 2003.

Zhang, W., et al., "DSP Implementation of Predictive Control Strategy for Power Factor Correction (PFC)," IEEE 2004, no date.

* cited by examiner

DIGITAL POWER FACTOR CORRECTION CONTROLLER AND AC-TO-DC POWER SUPPLY INCLUDING SAME

BACKGROUND

The present invention relates generally to power electronics and, more particularly, to power factor correction (PFC) control circuits.

The average power obtained from an AC line supply through an AC-to-DC power supply is always less than the product of the RMS (root mean square) voltage and the RMS current. The ratio of the average power to the product of the RMS voltage and the RMS current is known as the power factor. For example, a converter having a power factor of 70% means that the power drawn from the line supply is 70% of the product of the voltage and current in the line and, thus, only 70% of what could be obtained with a unity power factor.

To increase the power factor of a power supply, and hence the efficiency of the power supply, it is known to employ power factor correction (PFC). One known method for achieving PFC is to force the average input current to follow an appropriately scaled instantaneous input voltage waveform. FIG. 1 is a diagram of a conventional PFC AC-to-DC power supply 10 having a rectifier bridge 12, a boost converter 14 and an analog PFC controller 16. The analog PFC controller 16, using analog circuitry, compares the output voltage (Vout) of the converter 10 to a voltage reference 8 to produce a voltage compensation signal B (Vcomp). The voltage compensation signal is multiplied by the input voltage (Vin) and divided by the square of the RMS of the input voltage. The result of this operation is compared to the input current (Iin) to determine the duty cycle of the main power switch 18 of the boost converter 14.

Although it is known to use microcontrollers for some control and monitoring functions in PFC converters, pulse-by-pulse switch control is ordinarily realized with a specialized analog pwm controller. This approach, however, limits the scope and performance of feasible control and monitoring functions. With the progress of digital technology, however, there is an increasing incentive to use digital means for the entirety of the control and monitoring functions. The speed and resolution required for such control, however, made it, until recently, prohibitively expensive to realize in low and medium power converters.

In that connection, digital signal processors (DSPs) are well suited for the task of performing all of the control functions for a PFC converter. DSPs can implement pulse-by-pulse switch control by executing firmware algorithms that calculate the optimal on-time duration of the main power switch. At the same time, the same DSP can perform all of the other control and monitoring functions required by the PFC converter by scheduling processor time slots assigned to various tasks or by interrupt routines.

While DSPs are generally sufficient for PFC converters, they are not optimized for such applications and in practice yield relatively cumbersome and expensive solutions. This is because high quality digital PFC ordinarily requires three high resolution analog to digital conversion channels, at least one of which needs to be high speed. Further, calculation of the proper timing for the main power switch ordinarily requires firmware execution of two relatively complex digital filters optimized for dynamic behavior and stability of the power stage—one for the average current loop and one for the voltage loop. Additionally, several time-critical protection functions, such as overcurrent and overvoltage, must be simultaneously included. All of these functions have to be executed in real time for proper operation of the converter. The existence of multiple time-critical control functions competing for the computing resources of a signal DSP complicates the firmware by introduction of complex scheduling and multilevel interrupt routines. This is turn increases the risk of unintended behavior compromising the operation of the converter. To overcome these challenges, relatively powerful DSPs and complex routines must be used. This makes acceptable DSP implementations prohibitively expensive for low and medium power converters.

Similar challenges have been known in other types of switched mode converters, such as DC/DC point-of-load (POL) converters. One of the ways proposed for DC/DC POL converters to reduce the computational burden of the main processor is to introduce a specialized hardware filter for realizing the main control loop. The coefficients of this filter can be programmed by the main processor to accommodate the dynamic requirements of the converter. This, however, needs to be done only once or perhaps modified only in special situations (abnormal operation, system configuration change, parameters drift, etc).

To reduce further the hardware resources needed for digital pwm controllers, so called "window a/d conversion" has been proposed. In this scheme, the analog-to-digital converter monitoring the output voltage is designed to process only a relatively narrow range of amplitudes around the desired (target) voltage. The insight behind this approach is such that during normal operation the output voltage is very close to the target value. This is because modern electronic systems require very precise voltage regulation and such performance is absolutely necessary for proper operation of the whole system. If the output voltage dwells outside the target window, emergency shut down or other special measures are usually implemented.

Although digital controllers employing window a/d conversion are popular in DC-to-DC converters, such controllers are not suitable for PFC converters. This is because such controllers work only with a single voltage loop, while PFC requires two loops and one of them is an average current mode control loop.

SUMMARY

In one general aspect, the present invention is directed to a PFC controller for use in an AC-to-DC, high power factor, switching power supply. High power factor may be achieved by forcing the amplitude of the input current to follow the instantaneous amplitude of the input voltage. According to various embodiments, the PFC controller divides control tasks between firmware (processor code), digital hardware and analog hardware. This division can provide a good fit between the type of technology used in a given part of the control system and the kind of signal processing required. The PFC controller may comprise two control loops. A first control loop—the output voltage loop—may be realized by a processor executing associated firmware code. The processor and firmware may be part of a microcontroller, for example. Due to the very low bandwidth of this control loop, the code execution may require very little computational power and, as a result, a relatively slow analog-to-digital converter can be used. Thus, a relatively low cost microcontroller can be used for the output voltage control loop.

In various implementations, the output of the voltage control loop is multiplied by a signal proportional to the sampled instantaneous input voltage and divided by another signal proportional to the squared sampled rms input voltage. The result of this operation is subsequently converted to an analog voltage proportional to desired instantaneous input current (neglecting the switching ripple).

This analog voltage is next used as a reference voltage for an analog-to-digital converter, preferably a window a/d converter that monitors the instantaneous value of the input current. Due to the "window" configuration of the a/d converter, low resolution (for example 6 bits) may suffice. Therefore, a high speed, low cost, flash type window a/d converter can be used in certain applications.

The second control loop—the average current loop—may be implemented with a dedicated hardware filter with programmable coefficients. This arrangement preferably does not require any computational resources of the processor on a regular basis. This loop forces the average input current to follow the analog reference signal fed into the window a/d converter.

With such a PFC controller, the total amount of hardware resources and the cost necessary for implementation of the controller can be significantly reduced.

FIGURES

Embodiments of the present invention are described herein by way of example in conjunction with the following figures, wherein.

DETAILED DESCRIPTION

Figure 1:
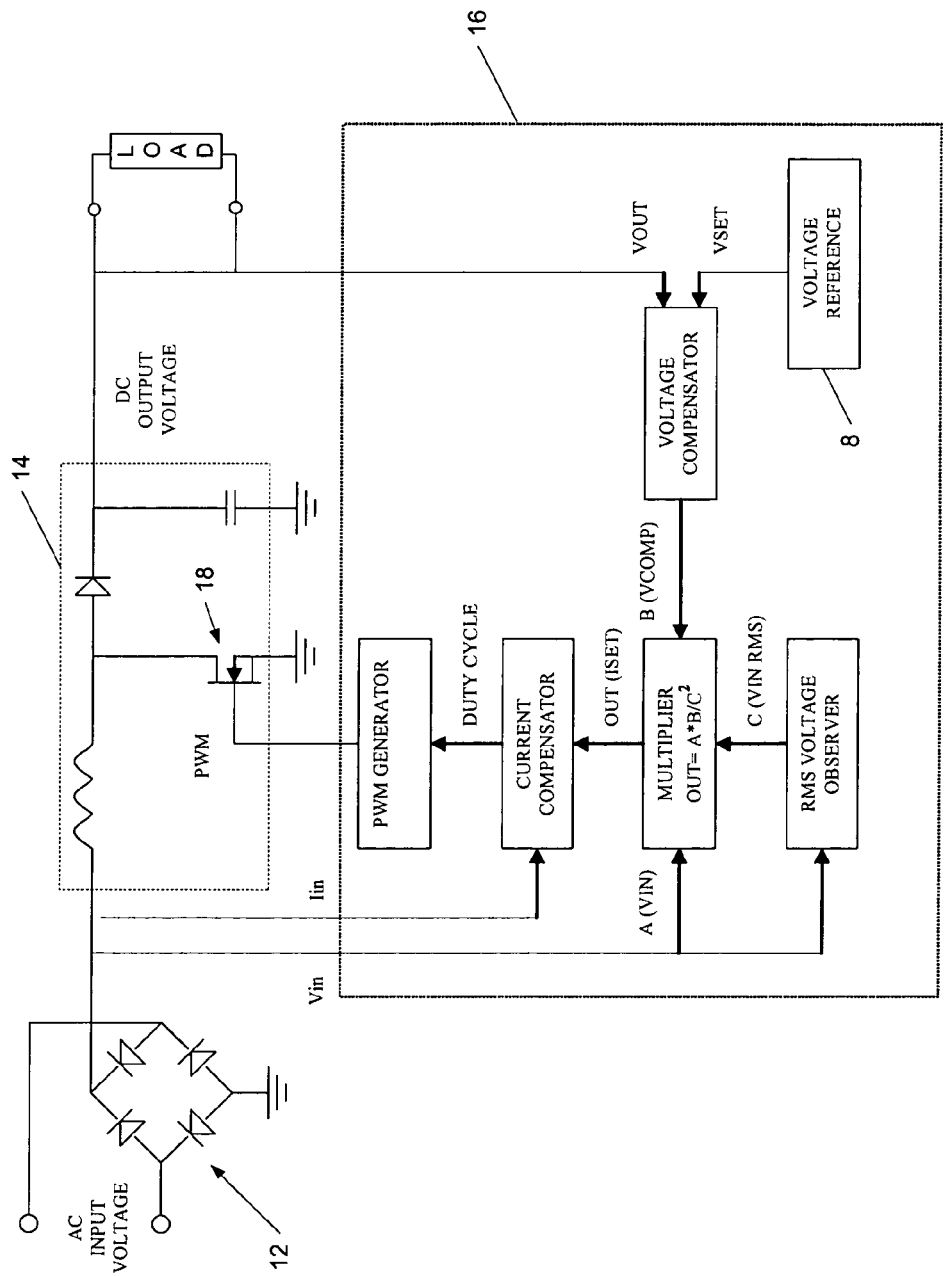
FIG. 1 is a diagram of a prior art PFC AC-to-DC power supply.
Figure 2:
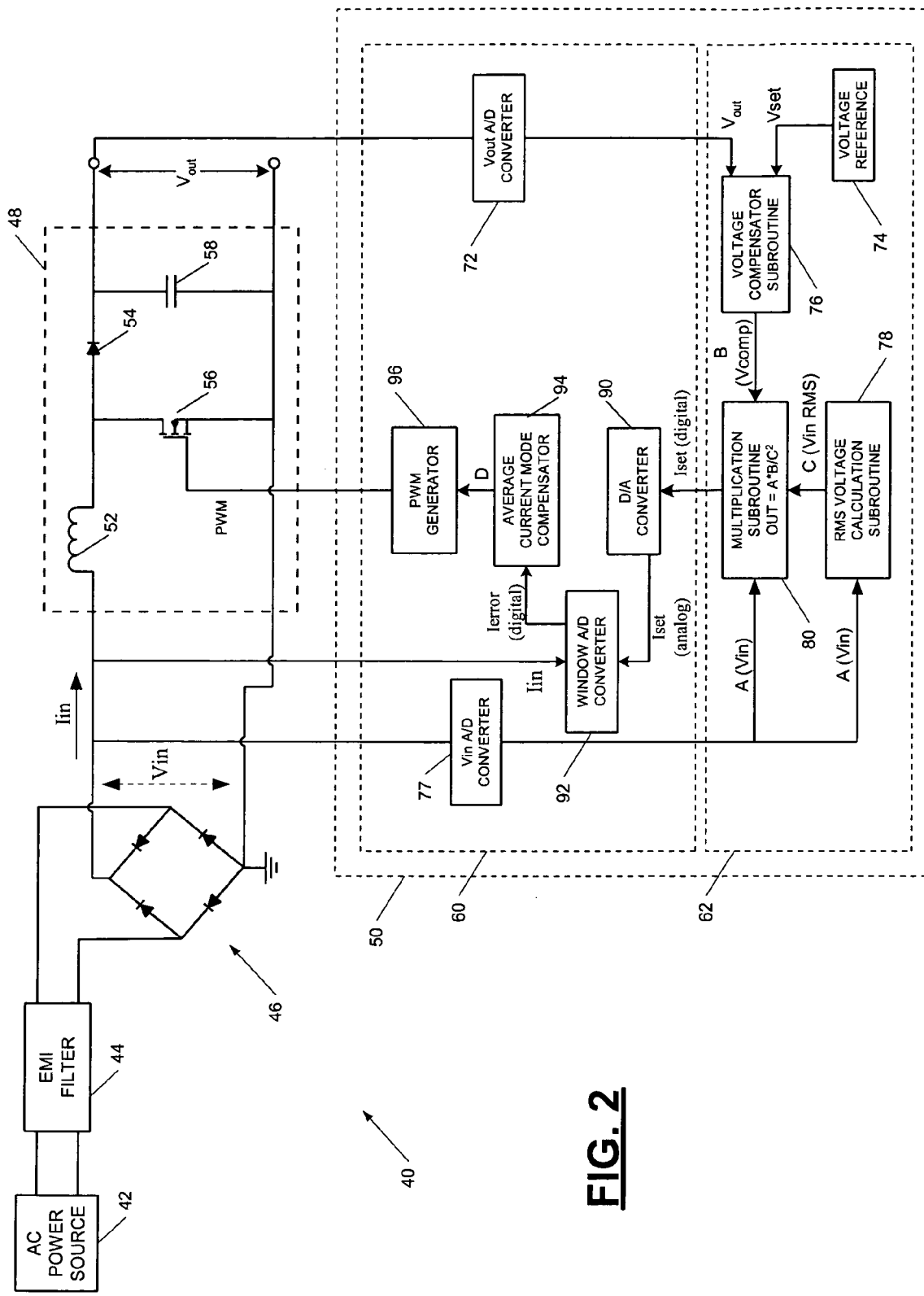
FIG. 2 is a diagram of a PFC AC-to-DC power supply according to various embodiments of the present invention.

FIG. 2 is a diagram of a PFC AC-to-DC power supply 40 according to various embodiments of the present invention. The power supply 40 includes an AC power source 42, an EMI filter 44, a rectifier circuit 46, a converter 48, and a PFC controller 50. The power supply 40 may be used to provide a regulated DC voltage output ($V_{out}$) from the AC voltage supplied by the AC power source 42.

The AC power source 42 may supply a sinusoidal voltage signal having a fundamental frequency ω. The fundamental frequency ω may be, for example, 60 Hz. The EMI filter 44 may be connected between the AC power source 42 and the rectifier circuit 46, as illustrated in FIG. 2, and may filter unwanted noise. The rectifier circuit 46 may be a full-wave rectification circuit capable of converting the sinusoidal input voltage signal from the AC power source 42 to a voltage waveform in which each half cycle is positive. According to one embodiment, the rectifier circuit 46 may include a four-diode bridge rectifier circuit, as shown in FIG. 2.

The converter 48 converts the rectified AC input voltage (Vin) to the DC output voltage ($V_{out}$) that may be used to power a load (not shown). As shown in FIG. 2, the converter 48 is preferably a boost converter because of its ability to produce an output voltage higher than the input voltage while maintaining full regulation, continuous input current and simplicity. As such, converter 48 may include an inductor 52, a rectifier 54 (e.g., a diode), a power switch 56, and a filter capacitor 58. The inductor 52, the rectifier 54, and the filter capacitor 58 are connected in series, with the capacitor 58 connected across the output of the power supply 40. The power switch 56 is connected across the rectifier 54 and the filter capacitor 58 such that the duty cycle of the power switch 56 controls the voltage across the filter capacitor 58 (and hence the output voltage $V_{out}$). The power switch 56 may be a voltage-controlled switch such as, for example, a field effect transistor (FET), such as a MOSFET.

In operation, when the power switch 56 is closed, current flows through the inductor 52 and the power switch 56, and the rectifier 54 is reversed biased. The current flowing through the inductor 52 causes energy to be stored in the inductor 52. Accordingly, when the power switch 56 is opened, the inductor 52 causes the voltage at the node P between the inductor 52 and the rectifier 54 to increase rapidly up to the point when the rectifier 54 becomes forward-biased, and current flows through the rectifier 54 to the filter capacitor 58 and the load. After the energy stored by the inductor 52 has been transferred to the capacitor 58 through the rectifier 54, the power switch 56 is closed, thus again causing the rectifier 54 to be reversed biased and another quantity of energy to stored in the inductor 52.

In such a fashion, the duty cycle of the power switch 56 may be modulated to regulate the voltage across the filter capacitor 58, and hence the output voltage $V_{out}$. At the same time duty cycle can be modulated to maintain the value of the input current proportional to the instantaneous input voltage (neglecting the switching ripple). Achieving both objectives simultaneously is possible because of their separation in the frequency domain. With the input current, the concern is the fundamental frequency of the AC line (for example 60 Hz) and its harmonics (120 Hz, 180 Hz, etc), while the output voltage may be regulated only with respect to the frequencies below 60 Hz. Resulting sluggishnes of the voltage loop does not create a problem because of the usual significant energy storage realized by the output capacitors (e.g., capacitor 58).

As described below, the duty cycle of the power switch 56 is controlled by a PWM signal produced by the PFC controller 50 based on the output voltage $V_{out}$, the rectified AC input voltage (Vin), and the input current (Iin) to provide a desired output voltage with appropriate power factor correction. A sense resistor (not shown) may be used to produce a signal that is proportional to the input current (Iin).

Although the DC/DC converter 48 shown in FIG. 2 is a boost converter, it should be recognized that other switching DC/DC topologies could be used, such as buck, buck-boost, Cuk, Sepic, their isolated derivatives, etc.

The regulation objective of the PFC controller 50 is to maintain the constant value of the output voltage (Vout) while forcing the input current (Iin) to follow the shape of the input voltage (Vin), although the output voltage may be allowed to deviate to some extent from the target value to avoid distortion of the input current. Therefore, the output voltage may contain some amount of low frequency fluctuation, mostly at the second harmonic of the AC line frequency. On the other hand, the input current may contain a large high frequency ac component consisting mostly of the switching frequency and its harmonics. These current components may be removed by the EMI filter 44. Both the voltage and current distortions mentioned above are well known in the art and are omitted in the following description as immaterial for practicing the invention.

Figure 3:
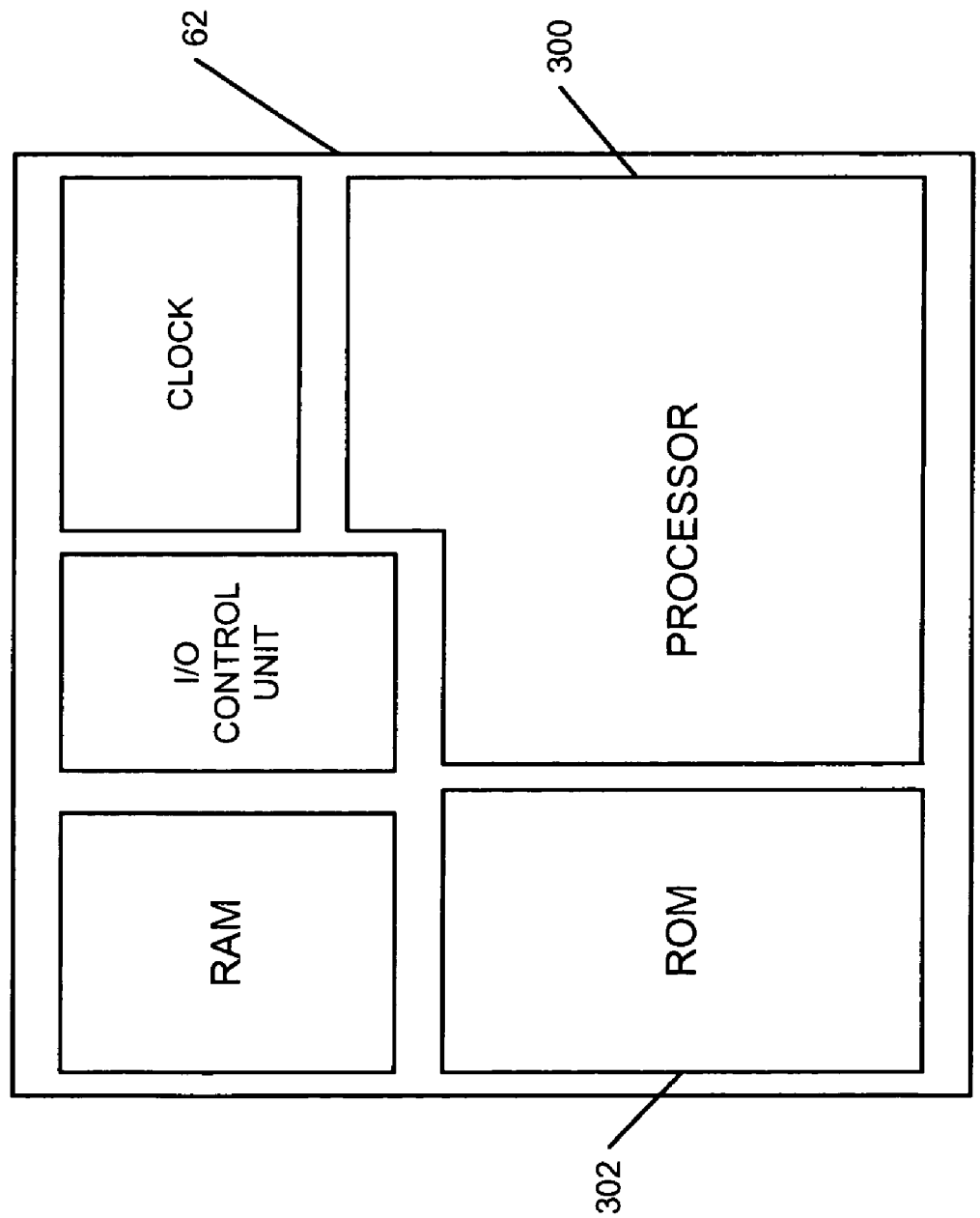
FIG. 3 is a diagram of a processing unit according to various embodiments of the present invention.

The PFC controller 50 may include, according to various embodiments, hardware circuitry 60 and a processing unit 62. The processing unit 62 may include a processor 300 and a memory unit, such as a ROM 302, as shown in the embodiment of FIG. 3. The memory unit 302 may store firmware code or instructions for execution by the processor 300 of the processing unit 62 as described in more detail below. As mentioned below, the processing unit 62 may be implemented as a microcontroller. It should be recognized, however, that according to other embodiments the firmware may be stored in a memory unit that is in a different device from the processor.

The desired operation of the PFC controller 50 is obtained, according to various embodiments, by arranging the control circuit in two loops. A first, outer, voltage loop maintains a constant value for the output voltage. The output voltage is sampled and converted to digital form by a voltage a/d converter 72. This converter 72 can be relatively slow due to the relatively low bandwidth of the voltage control loop, which typically is arranged to be slightly below the ac line frequency. A sampling rate of several hundred hertz is typically sufficient.

In the processing unit 62, the result of the output voltage measurement is subtracted from the target voltage (Vset) stored in an appropriate register 74. The difference between these two values can be considered a regulation error (voltage error). This error is subsequently used to modify the duty cycle of the power switch 56 in such a way as to counteract this error. In order to maintain stability and dynamic properties of the voltage regulation, appropriate frequency compensation of the error signal is performed as is well known in the art. This compensation is preferably realized entirely by execution of code (i.e., the voltage compensator subroutine 76) stored in the firmware of the processing unit 62. Because of the low bandwidth and low accuracy of the voltage control loop, the necessary computations can be performed by simple, low cost microcontroller as the processing unit 62.

Following the voltage error compensation are multiplication and division steps. According to various embodiments, multiplication is performed between the output of the voltage compensation routine 76 (Vcomp, or B) and a signal (A) proportional to the instantaneous input voltage. The signal A is produced by a voltage a/d converter 77 responsive to the input voltage. As a result of the multiplication, a signal following the shape of the input voltage is obtained. This signal is then divided by the squared value of the signal representing rms input voltage (C). The purpose of this operation is introduction of the feedforward path, allowing the PFC controller to adequately respond to fast changes in the input voltage without waiting for correction from slow feedback loop (described below). Again, the above-described mathematical calculations are preferably realized entirely by execution of code stored in the firmware of the processing unit 62. For example, a rms voltage calculation subroutine 78 may calculate the rms input voltage based on the signal (A) proportional the instantaneous input voltage. A multiplication subroutine 80 may perform the multiplication/division operations ($A*B/C^2$) to produce a digital signal representative of desired input current (Iset). The multiplication and division operations may be performed typically at a repetition rate of several kilohertz to avoid producing additional harmonic distortion. Such a low rate also makes it convenient to implement by firmware code execution.

The modification of the duty cycle by the voltage loop is preferably not performed directly. Instead the output of the multiplier (Iset) may constitute the reference value for the inner, average current loop, which may have a much higher bandwidth than the voltage loop. Because of the higher bandwidth of average current control loop, it is preferably implemented entirely using the hardware circuitry 60, without executing the firmware code of the processing unit 62.

According to various embodiments, the output of the multiplication subroutine 80 (Iset) is first converted to analog form (voltage or current) by a d/a converter 90. The amplitude of this analog signal becomes a reference level for an analog to digital converter 92. The a/d converter 92 is preferably implemented with a window a/d converter 92 monitoring the input current (Iin). As explained before, the voltage of this signal may be representative of input current. The window a/d converter 92 measures the difference between the signal representing input current (Iin) and aforementioned reference current signal (Iset). The difference produced by the window a/d converter 92 constitutes the error of the current signal in digital form. To properly process the error signal, a relatively small resolution may be sufficient. Accordingly, a simple, inexpensive but fast flash a/d converter can be used for the window a/d converter 92.

Next, the error signal (Ierror) is fed into a dedicated digital average current mode compensator 94, which generates a signal "D" indicative of the appropriate duty ratio for the PWM control signal. This compensator 94 may be implemented entirely in hardware using, for example, logic gates, delay elements and look-up tables as is well known in the digital control field. In various embodiments, the average current mode compensator 94 can compute the necessary compensation with relatively little resources, even if the required regulation speed and resolution by far exceed the capabilities of a conventional low cost, 8 bit microcontroller. Therefore, an expensive and complex DSP processor need not need to be used in the current loop. Further, removing the time critical task of current loop compensation from the firmware code of the processing unit 62 implementing the voltage control loop may result in great simplification and improved robustness of the firmware code.

Modification of the compensator 94, such as may be necessary for power circuit changes or dynamic performance adjustments, can be done by the processing unit 62. To this end, the processing unit 62 may change the contents of certain dedicated registers modifying the structure of logic circuits of the compensator 94 such that desired regulation objectives can be achieved. Such modifications, however, ordinarily do not need to performed frequently and do not increase the computational burden on the processing unit 62.

The output (D) of the current loop compensator 94 is fed into a PWM generator 96, which generates the PWM signal for controlling the power switch 56 (or power switches) of the converter 48. The PWM generator 96 may be realized with dedicated hardware due to its very high temporal resolution. The PWM pulse is preferably adjusted within no more than a few nanoseconds steps, otherwise adverse effects of quantization errors may diminish the quality of the regulation.

The PFC controller 50, according to various embodiments, may therefore be characterized by an optimal split of the signal processing functions between various parts of the overall circuit. Depending on the bandwidth, range, amplitude and temporal resolution, the PFC controller 50 may alternate the flow of the signal between firmware, digital hardware and analog hardware. This permits simple, low cost implementation of digital power factor correction control functions.

Although the present invention has been described herein with respect to certain embodiments, those of ordinary skill in the art will recognize that many modifications and variations of the present invention may be implemented. For example, as explained above, different topologies may be used for the converter 48. Also, the converter 48 may include one or more than one power switches that are controlled (directly or indirectly) by the PWM signal produced by the PFC controller 50. The foregoing description and the following claims are intended to cover all such modifications and variations.

What is claimed is:

1. A PFC AC-to-DC power supply comprising:
   a switching converter comprising at least one main power switch; and
   a PFC controller for controlling the at least one main power switch, wherein the PFC controller comprises:
      a processing unit comprising a processor and a memory having firmware stored thereon which, when executed by the processor, causes the processor to compute an input current set point for the AC-to-DC power supply based on the input and output voltage of the AC-to-DC power supply; and
      hardware circuitry in communication with the processing unit, wherein the hardware circuitry comprises:
         a first a/d converter for outputting a digital input current error value based on the input current of the AC-to-DC power supply and an analog form of the input current set point from the processing unit; and
         a digital current mode compensator in communication with the first a/d converter for determining the duty cycle for the at least one main power switch based on the digital input current error value from the a/d converter.

2. The PFC AC-to-DC power supply of claim 1, wherein the first a/d converter comprises a window a/d converter that measures the difference between the input current and the input current set point computed by the processing unit to produce the digital input current error value.

3. The PFC AC-to-DC power supply of claim 2, wherein the hardware circuitry further comprises a d/a converter for converting the input current set point from the processing unit to analog form, wherein the analog form of the input current set point produced by the d/a converter is supplied to the window a/d converter.

4. The PFC AC-to-DC power supply of claim 3, wherein the hardware circuitry further comprises a PWM generator in communication with the digital current mode compensator and the at least one main power switch for generating a PWM control signal for the at least one main power switch based on the duty cycle determined by the digital current mode compensator.

5. The PFC AC-to-DC power supply of claim 4, wherein the hardware circuitry further comprises a second a/d converter for converting the output voltage of the AC-to-DC power supply to digital form for input to the processing unit.

6. The PFC AC-to-DC power supply of claim 5, wherein the hardware circuitry further comprises a third a/d converter for converting the input voltage of the AC-to-DC power supply to digital form for input to the processing unit.

7. The PFC AC-to-DC power supply of claim 1, wherein the processor and the memory of the processing unit are part of a microcontroller.

8. The PFC AC-to-DC power supply of claim 1, wherein the switching converter includes a boost converter.

9. A PFC AC-to-DC power supply comprising:
   a boost converter comprising at least one main power switch; and
   a PFC controller for controlling the at least one main power switch, wherein the PFC controller comprises:
      a processing unit comprising a processor and a memory having firmware stored thereon which, when executed by the processor, causes the processor to compute an input current set point for the AC-to-DC power supply based on the input and output voltage of the AC-to-DC power supply; and
      hardware circuitry in communication with the processing unit, wherein the hardware circuitry comprises:
         a window a/d converter for outputting a digital input current error value based on the input current of the AC-to-DC power supply and an analog form of the input current set point from the processing unit; and
         a digital current mode compensator in communication with the window a/d converter for determining the duty cycle for the at least one main power switch based on the digital input current error value from the window a/d converter.

10. The PFC AC-to-DC power supply of claim 9, wherein the hardware circuitry further comprises:
   a d/a converter for converting the input current set point from the processing unit to analog form, wherein the analog form of the input current set point produced by the d/a converter is supplied to the window a/d converter; and
   a PWM generator in communication with the digital current mode compensator and the at least one main power switch for generating a PWM control signal for the at least one main power switch based on the duty cycle determined by the digital current mode compensator.

11. The PFC AC-to-DC power supply of claim 10, wherein the processor and the firmware are part of a microcontroller.

12. A PFC controller for controlling at least one main power switch of an AC-to-DC power supply comprising:
   a processing unit comprising a processor and a memory having firmware stored thereon which, when executed by the processor, causes the processor to compute an input current set point for the AC-to-DC power supply based on the output voltage of the AC-to-DC power supply; and
   hardware circuitry in communication with the processing unit, wherein the hardware circuitry comprises:
      a first a/d converter for outputting a digital input current error value based on the input current of the AC-to-DC power supply and an analog form of the input current set point from the processing unit; and
      a digital current mode compensator in communication with the first a/d converter for determining the duty cycle for the at least one main power switch based on the digital input current error value from the a/d converter.

13. The PFC controller of claim 12, wherein the first a/d converter comprises a window a/d converter that measures the difference between the input current and the input current set point computed by the processing unit to produce the digital input current error value.

14. The PFC controller of claim 13, wherein the hardware circuitry further comprises a d/a converter for converting the input current set point from the processing unit to analog form, wherein the analog form of the input current set point produced by the d/a converter is supplied to the window a/d converter.

15. The PFC controller of claim 14, wherein the hardware circuitry further comprises a PWM generator in communication with the digital current mode compensator and the at least one main power switch for generating a PWM control signal for the at least one main power switch based on the duty cycle determined by the digital current mode compensator.

16. The PFC controller of claim 15, wherein the hardware circuitry further comprises a second a/d converter for converting the output voltage of the AC-to-DC power supply to digital form for input to the processing unit.

17. The PFC controller of claim 16, wherein the hardware circuitry further comprises a third a/d converter for converting the input voltage of the AC-to-DC power supply to digital form for input to the processing unit.

18. The PFC controller of claim 12, wherein the processor and the memory of the processing unit are part of a microcontroller.

19. The PFC AC-to-DC power supply of claim 1, wherein the input current set point is computed by the processing unit based on $A*B/C^2$, where A represents the input voltage, B represents a voltage error based on the output voltage, and C represents the root mean square of the input voltage.

20. The PFC AC-to-DC power supply of claim 9, wherein the input current set point is computed by the processing unit based on $A*B/C^2$, where A represents the input voltage, B represents a voltage error based on the output voltage, and C represents the root mean square of the input voltage.

21. The PFC controller of claim 12, wherein the input current set point is computed by the processing unit based on $A*B/C^2$, where A represents the input voltage, B represents a voltage error based on the output voltage, and C represents the root mean square of the input voltage.

* * * * *